United States Patent
Lambert et al.

(10) Patent No.: US 9,389,147 B1
(45) Date of Patent: Jul. 12, 2016

(54) DEVICE DETERMINED BANDWIDTH SAVING IN TRANSMISSION OF EVENTS

(71) Applicant: Lytx, Inc., San Diego, CA (US)

(72) Inventors: Daniel Lambert, Carlsbad, CA (US); Joshua Donald Botnen, San Diego, CA (US)

(73) Assignee: Lytx, Inc., San Diego, CA (US)

( * ) Notice: Subject to any disclaimer, the term of this patent is extended or adjusted under 35 U.S.C. 154(b) by 195 days.

(21) Appl. No.: 13/736,839

(22) Filed: Jan. 8, 2013

(51) Int. Cl.
*G01M 17/00* (2006.01)
*G01M 17/007* (2006.01)
*G07C 5/00* (2006.01)

(52) U.S. Cl.
CPC ............ *G01M 17/007* (2013.01); *G07C 5/008* (2013.01)

(58) Field of Classification Search
CPC .............. G01M 17/00; G06F 11/3058; G06F 11/3013; G08G 1/052; G08G 1/20
USPC .......... 701/1, 32.2–32.5, 32.7–32.8, 701/33.3–33.4, 33.9, 34.4
See application file for complete search history.

(56) References Cited

U.S. PATENT DOCUMENTS

| | | | |
|---|---|---|---|
| 5,497,419 A | 3/1996 | Hill | |
| 5,689,442 A * | 11/1997 | Swanson et al. | 380/241 |
| 5,815,093 A | 9/1998 | Kikinis | |
| 6,141,611 A * | 10/2000 | Mackey et al. | 701/32.2 |
| 6,389,340 B1 | 5/2002 | Rayner | |
| 7,024,255 B1 | 4/2006 | Brown et al. | |
| 7,043,343 B1 | 5/2006 | Houlberg et al. | |
| 7,103,460 B1 | 9/2006 | Breed | |
| 7,313,467 B2 | 12/2007 | Breed et al. | |
| 7,317,974 B2 | 1/2008 | Luskin et al. | |
| 7,859,392 B2 * | 12/2010 | McClellan et al. | 340/441 |
| 8,054,196 B2 | 11/2011 | Hilliar Isaacson | |
| 2001/0005804 A1 | 6/2001 | Rayner | |
| 2004/0236474 A1* | 11/2004 | Chowdhary et al. | 701/1 |
| 2005/0131585 A1 | 6/2005 | Luskin et al. | |
| 2006/0092043 A1 | 5/2006 | Lagassey | |
| 2007/0135979 A1 | 6/2007 | Plante | |
| 2007/0136078 A1 | 6/2007 | Plante | |
| 2007/0173994 A1 | 7/2007 | Kubo et al. | |
| 2007/0257781 A1 | 11/2007 | Denson | |
| 2007/0260361 A1 | 11/2007 | Etcheson | |
| 2008/0059055 A1* | 3/2008 | Geelen et al. | 701/201 |
| 2008/0111666 A1 | 5/2008 | Plante et al. | |
| 2008/0252487 A1* | 10/2008 | McClellan et al. | 340/936 |
| 2008/0319604 A1* | 12/2008 | Follmer et al. | 701/35 |
| 2010/0023206 A1 | 1/2010 | Paquette et al. | |
| 2011/0213526 A1 | 9/2011 | Giles et al. | |
| 2011/0234749 A1* | 9/2011 | Alon | 348/36 |
| 2011/0238543 A1 | 9/2011 | Paez et al. | |
| 2013/0047039 A1* | 2/2013 | Manes et al. | 714/47.1 |
| 2013/0266185 A1* | 10/2013 | Bulan | G06K 9/3233 382/104 |
| 2014/0195105 A1 | 7/2014 | Lambert et al. | |

* cited by examiner

Primary Examiner — Thomas G Black
Assistant Examiner — Ce Li
(74) Attorney, Agent, or Firm — Van Pelt, Yi & James LLP

(57) ABSTRACT

A system for transmitting a driving event comprises an interface and a processor. The interface is configured to receive a portion of data. The processor is configured to detect a driving event based at least in part on the portion of data; determine whether the driving event satisfies a non-transmitting criteria; and in the event that the driving event satisfies the non-transmitting criteria, indicate that the driving event is not to be transmitted.

21 Claims, 5 Drawing Sheets

Exception Database

Location-Specific Legal Information Exceptions

| Type  | Map Segment | Location | Exception |
|-------|-------------|----------|-----------|
| Speed | 0007        | All      | 55 MPH    |
| Speed | 0012        | 10 -> 12 | 65 MPH    |
| Stop  | 0009        | 15.1     | No Stop   |

Customer-Specific Event Exceptions

| Type  | Exception    |
|-------|--------------|
| Speed | + 10 MPH     |
| Shock | - 15 m/s$^2$ |

Customer-Specific Region Exceptions

| Map Segment | Location  | Type  |
|-------------|-----------|-------|
| 0014        | All       | Speed |
| 0001        | 15 -> End | All   |

Fig. 4

DEVICE DETERMINED BANDWIDTH SAVING IN TRANSMISSION OF EVENTS

BACKGROUND OF THE INVENTION

Modern vehicles (e.g., airplanes, boats, trains, cars, trucks, etc.) can include a vehicle event recorder in order to better understand the timeline of an anomalous event (e.g., an accident). A vehicle event recorder typically includes a set of sensors, e.g., video recorders, audio recorders, accelerometers, gyroscopes, vehicle state sensors, GPS (global positioning system), etc., that report data, which is used to determine the occurrence of an anomalous event. If an anomalous event is detected, the sensor data related to the event is stored for later review. A vehicle event recorder for cars and trucks (e.g., vehicles that operate on public roads) can include road map data comprising location-specific legal information (e.g., speed limit information, stop sign information, traffic light information, yield sign information, etc.). Location-specific legal information can be used to identify an anomalous event in the case of the vehicle acting against the law (e.g., traveling in excess of the speed limit, rolling through a stop sign, etc.). If there is an error in the legal information, anomalous events can be incorrectly identified, possibly leading to unnecessary expense as the event is processed, stored, and/or transmitted.

BRIEF DESCRIPTION OF THE DRAWINGS

Various embodiments of the invention are disclosed in the following detailed description and the accompanying drawings.

FIG. 4 is a diagram illustrating an embodiment of an exception database.

DETAILED DESCRIPTION

Figure 1:
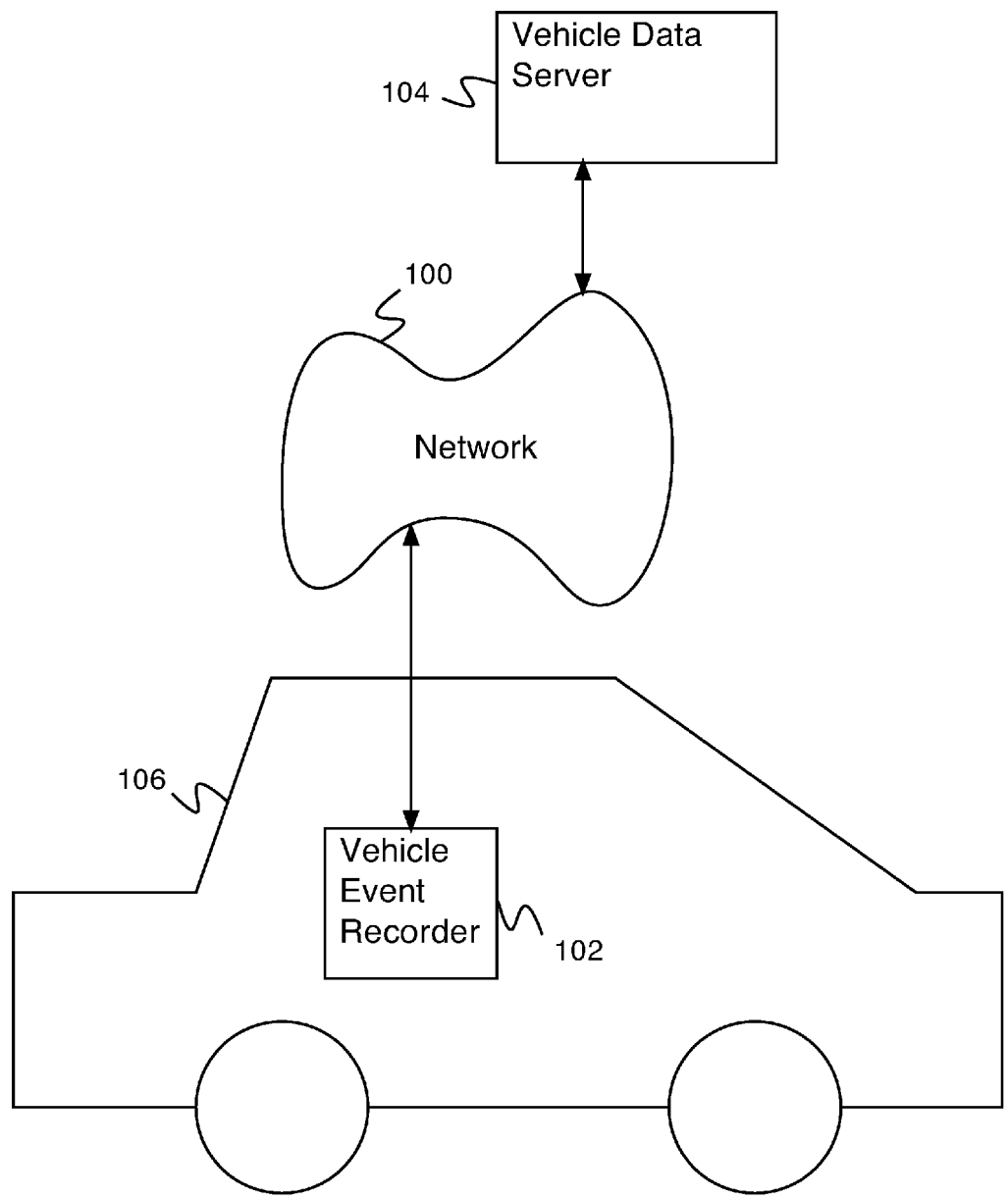
FIG. 1 is a block diagram illustrating an embodiment of a system including a vehicle event recorder.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Device determined bandwidth saving in transmission of events is disclosed. A system for transmitting a driving event comprises an interface configured to receive a portion of data. A system for transmitting a driving event comprises a processor configured to detect a driving event; determine whether the event satisfies a non-transmitting criteria; in the event that the event satisfies the non-transmitting criteria, indicate that the event is not to be transmitted; and a memory coupled to the processor and configured to provide the processor with instructions.

A vehicle event recorder system comprises a set of sensors comprising a Global Positioning System (GPS) and a set of map data. The GPS in conjunction with the map data serves to identify the position and speed of the vehicle on a road described in the map data. The map data comprises location-specific legal information for determining whether the vehicle is operating within the law. In some embodiments, the map data comprising location-specific legal information is provided to the manufacturer of the vehicle event recorder by a third party (e.g., by a map data vendor). In some embodiments, the location-specific legal information includes errors—for example, locations where indicated speed limit information differs from the actual speed limit (e.g., the legal default speed limit or the posted speed limit) or locations where a stop sign is indicated but none exists or parking in violation for a mislabeled no parking zone. Errors in stored location-specific legal information can lead to a vehicle operating according to the law being flagged for a violation in error. This raises costs when a violation is detected, the capture and transmission of a video recording is triggered, needlessly incurring costs to the owner of the vehicle event recorder system (e.g., cost of transmission, cost of storage on the recorder, cost of reviewing the event, etc.).

FIG. 1 is a block diagram illustrating an embodiment of a system including a vehicle event recorder. In the example shown, vehicle event recorder 102 comprises a vehicle event recorder mounted in a vehicle (e.g., a car or truck). Vehicle event recorder 102 comprises a set of sensors—for example, video recorders, audio recorders, accelerometers, gyroscopes, vehicle state sensors, GPS, outdoor temperature sensors, moisture sensors, laser line tracker sensors, or any other appropriate sensors. In various embodiments, vehicle state sensors comprise a speedometer, an accelerator pedal sensor, a brake pedal sensor, an engine revolution per minute (RPM) sensor, an engine temperature sensor, a headlight sensor, an airbag deployment sensor, driver and passenger seat weight sensors, an anti-locking brake sensor, an engine exhaust sensor, a gear position sensor, a cabin equipment operation sensor, or any other appropriate vehicle state sensors. In some embodiments, vehicle event recorder 102 receives sensor data or vehicle state sensor data from an on-board vehicle sensor. Vehicle event recorder 102 comprises map data. In some embodiments, vehicle event recorder 102 comprises a system for processing sensor data and detecting events. In some embodiments, vehicle event recorder 102 comprises a system for detecting risky behavior. In some embodiments, vehicle event recorder 102 comprises a system for detecting speed limit violation events. In some embodiments, vehicle event recorder 102 comprises a system for detecting stop sign violation events. Vehicle event recorder 102 comprises a system for saving bandwidth in transmission of events. In various embodiments, vehicle event recorder 102 is mounted on vehicle 106 in one of the following locations: the chassis, the front grill, the dashboard, the rear-view mirror, or any other appropriate location. In some embodiments, vehicle event recorder 102 comprises multiple units mounted in different locations in vehicle 106. In some embodiments, vehicle event recorder 102 comprises a communications system for communicating with network 100. In some embodiments, vehicle event recorder 102 comprises a system for transmitting vehicle event recorder data. In various embodiments, network 100 comprises a wireless network, a wired network, a cellular network, a local area network, a wide area network, the Internet, or any other appropriate network. Vehicle event recorder 102 communicates with vehicle data server 104 via network 100. Vehicle event recorder 102 is mounted on vehicle 106. In various embodiments, vehicle 106 comprises a car, a truck, a commercial vehicle, or any other appropriate vehicle type. Vehicle data server 104 comprises a vehicle data server for collecting events and risky behavior detected by vehicle event recorder 102. In some embodiments, vehicle data server 104 comprises a system for collecting data from multiple vehicle event recorders. In some embodiments, vehicle data server 104 comprises a system for analyzing vehicle event recorder data. In some embodiments, vehicle data server 104 comprises a system for displaying vehicle event recorder data.

Figure 2:
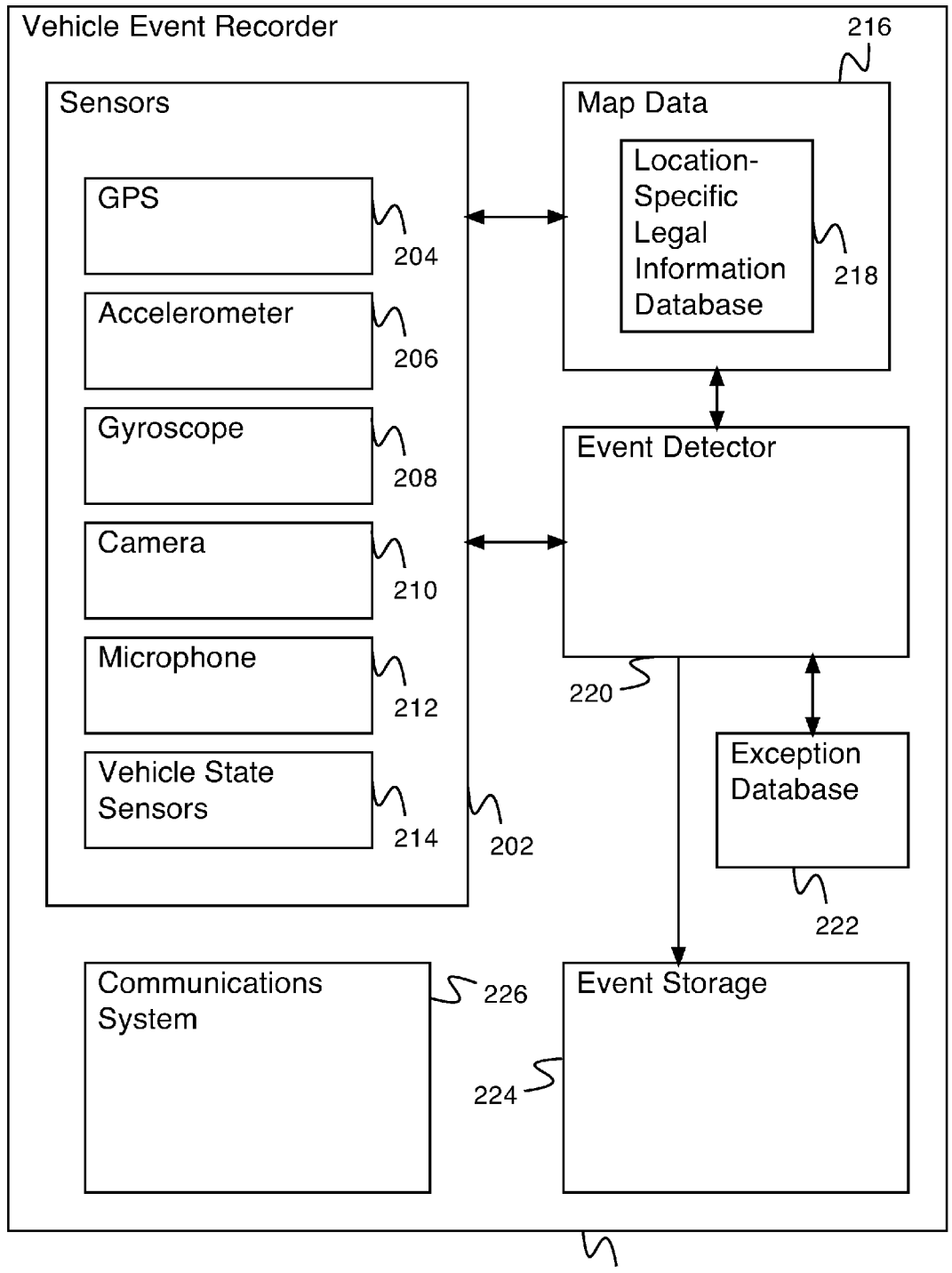
FIG. 2 is a block diagram illustrating an embodiment of a vehicle event recorder.

FIG. 2 is a block diagram illustrating an embodiment of a vehicle event recorder. In some embodiments, vehicle event recorder 200 of FIG. 2 comprises vehicle event recorder 102 of FIG. 1. In the example shown, vehicle event recorder 200 comprises sensors 202. Sensors 202 comprises GPS 204, accelerometer 206, gyroscope 208, camera 210, microphone 212, and vehicle state sensors 214. In various embodiments, sensors 202 additionally comprises outdoor temperature sensors, moisture sensors, laser line tracker sensors, or any other appropriate sensors. In various embodiments, vehicle state sensors 214 comprise a speedometer, an accelerator pedal sensor, a brake pedal sensor, an engine RPM sensor, an engine temperature sensor, a headlight sensor, an airbag deployment sensor, driver and passenger seat weight sensors, an anti-locking brake sensor, an engine exhaust sensor, a gear position sensor, a cabin equipment operation sensor, or any other appropriate vehicle state sensors. In some embodiments, vehicle state sensors 214 communicate via an OBD (on-board diagnostics) bus (e.g., on-board diagnostic bus of standard J1979, J1939, J1708, or J1587). Sensors 202 communicates with map data 216. In some embodiments, GPS 202 communicates with map data 216. In some embodiments, GPS 204 in conjunction with map data 216 can accurately report vehicle speed. In various embodiments, vehicle speed is determined by GPS 202, by a speedometer (e.g., by a speedometer of vehicle state sensors 214), by accelerometer 206, or by any other appropriate sensor or combination of sensors. Map data 216 comprises location-specific legal information database 218. In some embodiments, location-specific legal information database 218 comprises a database of location-specific legal information. In some embodiments, map data 216 with location-specific legal information database 218 are supplied by a third party vendor. In some embodiments, location-specific legal information database 218 has errors (e.g., map regions for which the speed limit differs from the actual speed limit, an incorrectly placed stop sign, etc.).

Event detector 220 communicates with sensors 202 and map data 216. In some embodiments, event detector 220 receives sensor data from sensors 202. In some embodiments, event detector 220 detects events using sensor data from sensors 202. In some embodiments, an interface receives data (e.g., from sensors) and a processor processes the data to determine whether an event has been detected. Event detector 220 receives map and speed limit information from map data 216. In some embodiments, event detector 220 uses map and speed limit information from map data 216 in conjunction with GPS data from sensors 202 (e.g., from GPS 204) in order to identify violation events (e.g., events violating legal information indicated in location-specific legal information database 218). In some embodiments, identifying a violating event comprises determining a current map segment. In some embodiments, identifying a violating event comprises determining subsegment information. In some embodiments, when event detector 220 detects a violation event, it records the event. In some embodiments, the event includes an indication of a version or a date of location-specific legal information database 218. In some embodiments, recording the event comprises recording video information. In some embodiments, recording the event comprises recording still picture information. In some embodiments, when event detector 220 detects a violation event, it stores the event in event storage 224. In some embodiments, event detector stores an image from camera 210 in event storage 224 associated with the violation event. In some embodiments, event detector 220 stores video from camera 210 in event storage 224 associated with the violation event. In some embodiments, when event detector 220 uses map and speed limit information from map data 216 in conjunction with GPS data from sensors 202 in order to identify violation events, events are identified incorrectly (e.g., a violation event is identified even though the vehicle is traveling in accordance with the law), due to an error in location-specific legal information database 218.

Event detector 220 additionally communicates with exception database 222. Exception database 222 comprises a database of exceptions—for example, criteria under which detected events should be ignored. In various embodiments, exception database 222 comprises locations for which the actual speed limit (e.g., the legal default speed limit or the posted speed limit) is known to be different from the speed limit recorded in location-specific legal information database 218, instances where a stop sign indicated in location-specific legal information 218 is known not to exist, regions for which a given customer has declared it is not interested in receiving exceptions, modifications of legal requirements a customer is interested in following (e.g., only record an event when a driver is more than 5 MPH over the speed limit), or any other appropriate exceptions. In some embodiments, in the event that event detector 220 detects a violation event, it checks the event against exception database 222. In various embodiments, in the event that the event detector determines a violation event has been identified incorrectly using exception database 222, the event and any associated images and/or video are deleted from event storage 224, the event and any associated images and/or video are soft deleted from event storage 224, or the event and any associated images and/or video are modified in any other appropriate way. In some embodiments, soft deleting the event and any associated images and/or video comprises marking the event and any associated images and/or video for deletion but not removing them from storage until the storage space is required for other data.

In some embodiments, vehicle event recorder 200 transmits event information to a vehicle data server (e.g., vehicle data server 104 of FIG. 1). In some embodiments, vehicle event recorder 200 transmits sensor data (e.g., GPS data, camera data, accelerometer data, etc.) to the vehicle data server. In some embodiments, in the event that the event detector determines a violation event has been identified incorrectly using speed limit exception database 222, the event (e.g., event information, sensor data, etc.) is not transmitted. In some embodiments, vehicle event recorder 200 communicates with the vehicle data server using communications system 226. In some embodiments, communications system 226 communicates with a network (e.g., network 100 of FIG. 1).

Figure 3:
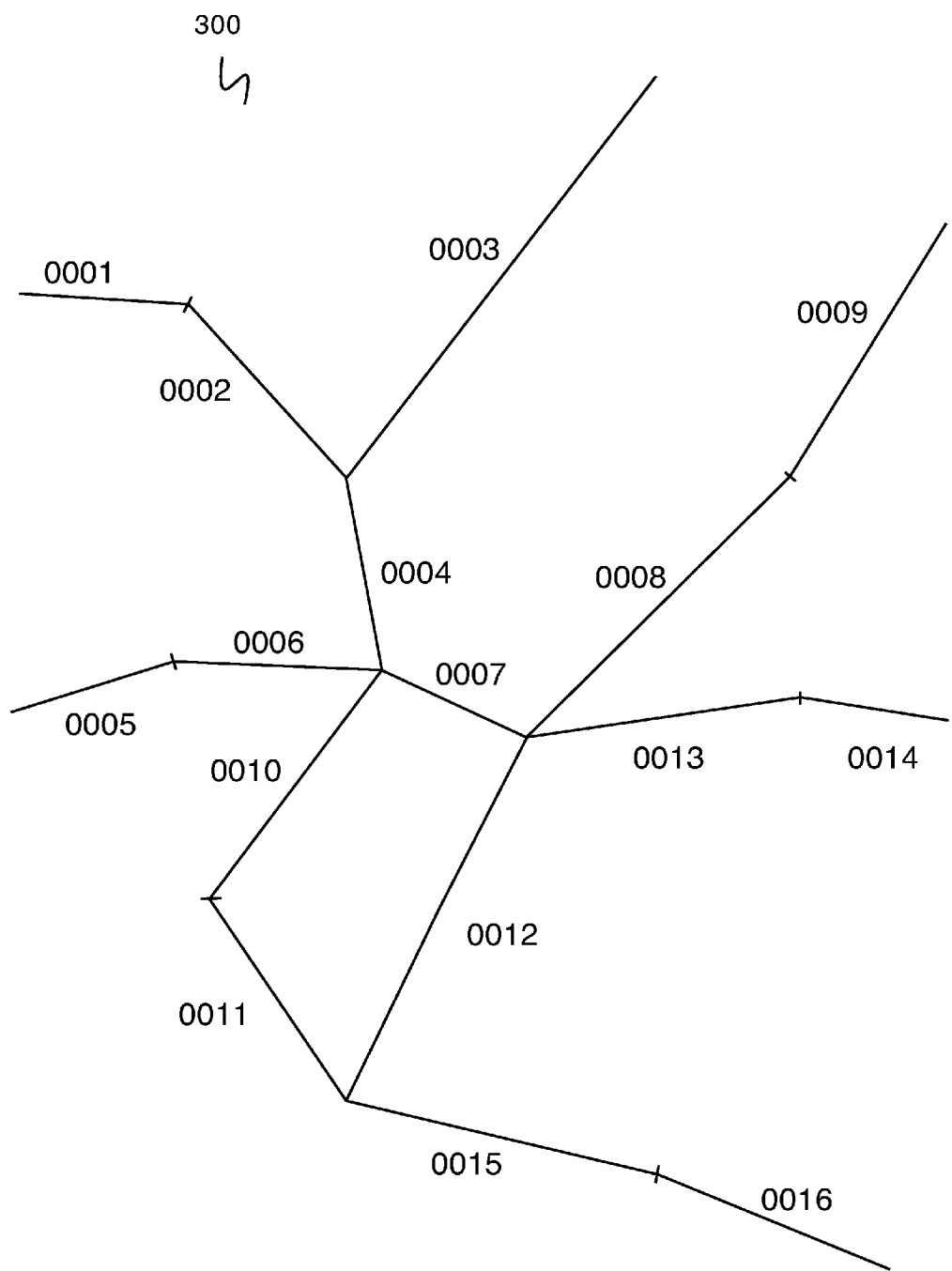
FIG. 3 is a diagram illustrating an embodiment of map segments.

FIG. 3 is a diagram illustrating an embodiment of map segments. In the example shown, map 300 is comprised of 16 segments numbered 0001 through 0016. In some embodiments, each map segment is a straight line. In some embodiments, a curved portion of a road is approximated in the map by one or more map segments. In some embodiments there is a maximum segment length. In various embodiments, the maximum segment length is 100 feet, 2000 feet, 1 mile, 10 miles, or any other appropriate maximum segment length. In some embodiments, a location-specific legal information database (e.g., location-specific legal information database 218 of FIG. 2) stores location-specific legal information data indexed by map segment. In some embodiments, an exception database (e.g., exception database 222 of FIG. 2) stores exception data indexed by map segment. In some embodiments, a location-specific legal information database or an exception database stores data with finer granularity than one data point per segment (e.g., multiple regions within a segment are defined each with associated legal information or exception information).

FIG. 4 is a diagram illustrating an embodiment of an exception database. In some embodiments, exception database 400 comprises exception database 222 of FIG. 2. In the example shown, exception database 400 comprises location-specific legal exceptions 402, customer-specific event exceptions 404, and customer-specific region exceptions 406. In some embodiments, location-specific legal information exceptions 402 comprises a set of exceptions to location-specific legal information (e.g., location-specific legal information from location-specific legal information database 218 of FIG. 2). In some embodiments, location-specific legal information exceptions 402 comprises locations for which location-specific legal information is known to be incorrect. In some embodiments, location-specific legal information exceptions 402 apply to all customers (e.g., to all customers of a vehicle event recorder service provider). In the example shown, a speed limit exception applies to all of segment 007, a speed limit exception applies to miles 10-12 of segment 12, and a stop sign exception exists at mile 15.1 of segment 9. In some embodiments, customer-specific event exceptions 404 comprises a set of exceptions that apply to all events of the indicated types for a specific customer. In some embodiments, customer-specific event exceptions 404 correspond to customer preferences for how events of various types should be handled. In some embodiments, customer-specific event exceptions 404 correspond to increased or reduced thresholds for when events of various types should be detected. In some embodiments, customer-specific event exceptions apply at any location. In the example shown, a speed limit exception is identified, indicating that a speed limit event should only be detected when the measured speed limit is 10 MPH greater than the legal speed limit, and a shock exception is identified, indicating that a shock event should be detected when the measured shock (e.g., measured by accelerometer 206 of FIG. 2) is 15 m/s² less than the preset threshold. In some embodiments, customer-specific region exceptions 406 comprises a set of exceptions that apply to the given region for a specific customer, for all exceptions of the given type. In some embodiments, customer-specific region exceptions 406 comprises a set of locations for which the customer desires to ignore all exceptions or exceptions of a given type. In the example shown, the customer is not interested in speed exceptions for any of map segment 14, or in any exceptions for mile 15 through the end of map segment 1.

Figure 5:
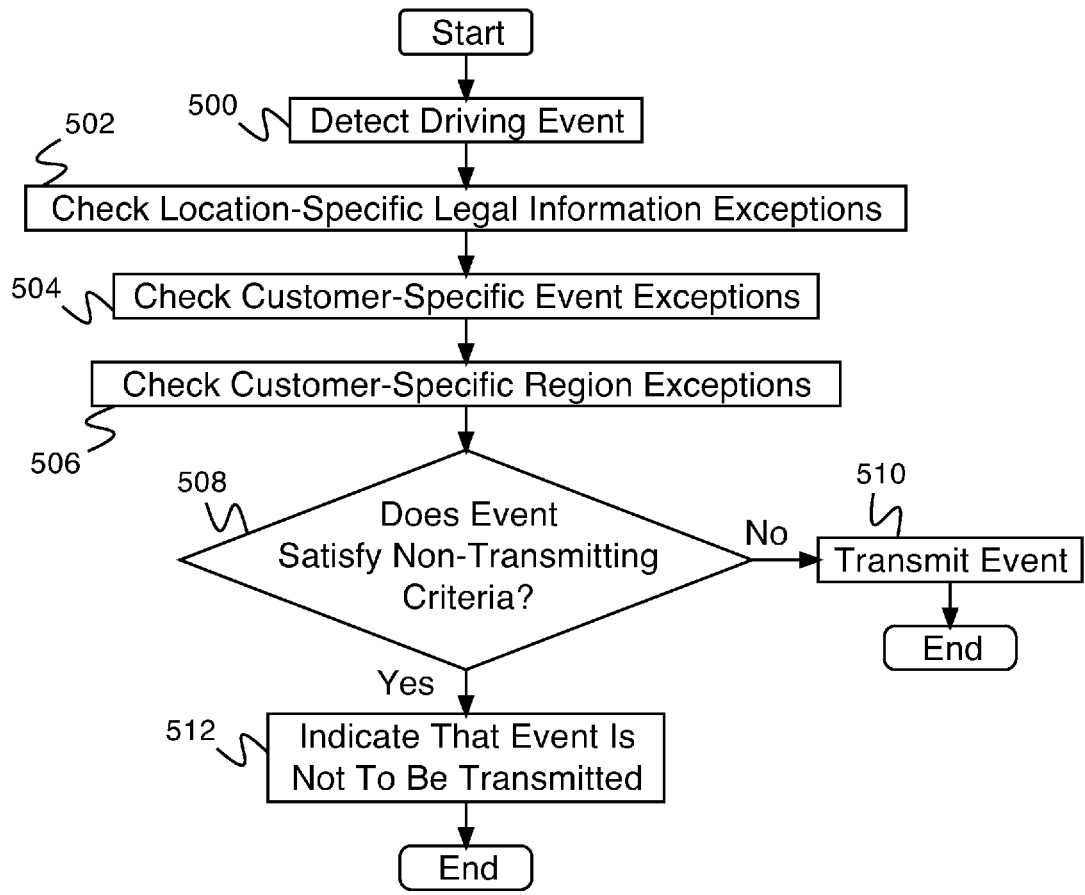
FIG. 5 is a flow diagram illustrating an embodiment of a process for transmitting a driving event.

FIG. 5 is a flow diagram illustrating an embodiment of a process for transmitting a driving event. In some embodiments, the process of FIG. 5 comprises a process for saving bandwidth in transmission of events. In some embodiments, bandwidth is saved by not transmitting events that correspond to exceptions. In some embodiments, the process of FIG. 5 is executed by a vehicle event recorder (e.g., vehicle event recorder 200 of FIG. 2). In 500, a driving event is detected (e.g., by event detector 220 of FIG. 2).

In 502, location-specific legal information exceptions (e.g., location-specific legal information exceptions 402 of FIG. 4) are checked. For example, it is determined whether a driving event at a location is subject to an exception by looking up the location in an exception database. The database indicates whether at that location there is an exception for specific type of driving event triggers (e.g., a map database includes an indication of a stop sign at a given intersection and the driving event was triggered based on not stopping at the intersection; however, the exception database indicates that there is no stop sign at the intersection so that the driving event was not triggered on a legitimate driving event, or similarly, for speeding in a map mislabeled speed zone, for passing in a map mislabeled no passing zone, etc.). For example, the location is looked up in the database and it is determined whether or not there is an associated exception to the location. Then, it is determined whether any exception associated with the location matches a driving event data or driving event trigger. In the event that there is a match between the driving event data and the exception, then it is indicated that the exception applies. In some embodiments, the exception applying determines that the driving event data is not transmitted and/or stored and/or indicated to be deleted.

In 504, customer-specific event exceptions (e.g., customer-specific event exceptions 404 of FIG. 4) are checked. For example, it is determined whether a driving event at a location is subject to an exception by looking up the customer in an exception database. The database indicates whether the customer has indicated that there is an exception for specific type of driving event triggers (e.g., a customer has indicated that rolling stops are not to be included in driving events, a customer has indicated that speeding events less than 10 miles per hour over the limit are not to be included in driving events, a customer has indicated that passing in a no passing zone are not to be included in driving events, etc.). For example, the location is looked up in the database and it is determined whether or not there is an associated exception to the location. Then, it is determined whether any exception associated with the location matches a driving event data or driving event trigger. In the event that there is a match between the driving event data and the exception, then it is indicated that the exception applies. In some embodiments, the exception applying determines that the driving event data is not transmitted and/or stored and/or indicated to be deleted.

In 506, customer-specific region exceptions (e.g., customer-specific region exceptions 406 of FIG. 4) are checked. For example, it is determined whether a driving event in a region is subject to an exception by looking up the customer in an exception database. The database indicates whether the customer has indicated that there is an exception for driving event triggers in a region (e.g., a customer has indicated any events in a region of remote desert are not to be included in driving events, a customer has indicated that parking in a no parking area in the downtown are not to be included in driving events, a customer has indicated that speeding less than 5 miles per hour in a non-school region is not to be included in driving events, etc.). For example, the location is looked up in the database and it is determined whether or not there is an associated exception to the location. Then, it is determined whether any exception associated with the location matches a driving event data or driving event trigger. In the event that there is a match between the driving event data and the exception, then it is indicated that the exception applies. In some embodiments, the exception applying determines that the driving event data is not transmitted and/or stored and/or indicated to be deleted.

In 508, it is determined if the event satisfies the non-transmitting criteria. In some embodiments, the event satisfies the non-transmitting criteria if it corresponds to any of the exceptions checked (e.g., the exceptions checked in 502, 504, and 506). In the event the event satisfies the non-transmitting criteria, control passes to 512. In 512, it is indicated that the event is not to be transmitted. In some embodiments, in the event that the event is indicated not to be transmitted, the event is deleted. In some embodiments, in the event that the event is indicated not to be transmitted, the event is soft deleted. In various embodiments, soft deleting an event comprises marking it for later deletion, deleting a reference to the event, moving it to a soft delete partition, or soft deleting it in any other appropriate way. In some embodiments, in the event that the event is indicated not to be transmitted, the event is marked as not transmitted. In some embodiments, in the event that the event is indicated not to be transmitted, the event is marked as deleted. If it is determined in 508 that the event does not satisfy the non-transmitting criteria, control passes to 510. In 510, the event is transmitted. In some embodiments, the event is marked that it has been checked against the exception database. In some embodiments, the event is marked with an indication of the version or date of the exception database.

In some embodiments, a non-transmitting criteria comprises an exception indication. In some embodiments, the exception indication is based on a location specific legal data. In various embodiments, the location specific legal data comprises one of the following: a speed limit error, a stop sign error, a parking zone error, railroad crossing error, or any other appropriate data.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system coupled to a vehicle for recording and transmitting a driving event, comprising:
    a plurality of sensors coupled to a vehicle to capture a portion of sensor data;
    a set of map data comprising location-specific legal information;
    a processor configured to:
        detect a driving event based at least in part on the portion of sensor data and the location-specific legal information, wherein the detected driving event comprises a stop sign violation, a parking zone violation, or a railroad crossing violation;
        check the driving event against an exception database comprising locations of errors in the location-specific legal information, wherein the locations of errors comprise a stop sign error location, a parking zone error location, a railroad crossing error location, or any combination thereof;
        determine whether the driving event satisfies a non-transmitting criteria, wherein the non-transmitting criteria comprises an exception indication as found in the exception database; and
        in the event that the driving event satisfies the non-transmitting criteria, indicate that the driving event is not to be transmitted to a vehicle data server; and an interface to:
        in the event that the event does not satisfy the non-transmitting criteria, send the driving event data to the vehicle data server over a network; and
    a memory coupled to the processor and configured to provide the processor with instructions.

2. A system as in claim 1, wherein the processor is further configured to:
    in the event that the driving event is indicated not to be transmitted:
    delete the driving event.

3. A system as in claim 1, wherein the processor is further configured to:
    in the event that the driving event is indicated not to be transmitted:
    soft delete the driving event.

4. A system as in claim 1, wherein the processor is further configured to:
    in the event that the driving event is indicated not to be transmitted:
    mark the driving event as not transmitted.

5. A system as in claim 1, wherein the processor is further configured to:
    in the event that the driving event is indicated not to be transmitted:
    mark the driving event as deleted.

6. A system as in claim 1, wherein the processor is further configured to:
    in the event that the driving event is not indicated not to be transmitted:
    transmit the driving event.

7. A system as in claim 6, wherein recording a driving event comprises recording video information or still picture information.

8. A system as in claim 1, wherein the exception database further comprises customer-specific region exceptions.

9. A system as in claim 8, wherein the customer-specific region exceptions comprise a set of exceptions that apply to a given region for a specific customer.

10. A system as in claim 1, wherein the processor is further configured to record a driving event.

11. A system as in claim 1, wherein the processor is further configured to determine a current segment.

12. A system as in claim 1, wherein the processor is further configured to determine subsegment information.

13. A system as in claim 1, wherein the processor is further configured to:
    in the event that the driving event does not satisfy non-transmitting criteria, mark that the driving event has been checked against the exception database.

14. A system as in claim 13, wherein the driving event is marked with an indication of a version or date of the exception database.

15. A system as in claim 1, wherein the driving event includes an indication of a version or date of the location-specific legal information.

16. A system as in claim 1, wherein in the event that the driving event satisfies the non-transmitting, the driving event that is indicated to not be transmitted comprises indicating not to transmit captured video data.

17. A system as in claim 1, wherein the exception database further comprises customer specific driving event types that are not to be transmitted.

18. A system as in claim 17, wherein the customer specific driving event types comprise a rolling stop.

19. A system as in claim 1, wherein:
one of the plurality of sensors comprises an accelerometer to capture shock values;
the detected driving event further comprises a shock event; and
the exception database further comprises a shock value of a driving event that is different than a preset threshold.

20. A method for recording and transmitting a driving event, comprising:
receiving a portion of sensor data from a plurality of sensors coupled to a vehicle;
receiving a set of map data comprising location-specific legal information;
detecting a driving event based at least in part on the portion of sensor data and the location-specific legal information, wherein the detected driving event comprises a stop sign violation, a parking zone violation, or a railroad crossing violation;
checking the driving event against an exception database comprising locations of errors in the location-specific legal information, wherein the locations of errors comprise a stop sign error location, a parking zone error location, a railroad crossing error location, or any combination thereof;
determining, using a processor, whether the driving event satisfies a non-transmitting criteria, wherein the non-transmitting criteria comprises an exception indication as found in the exception database; and
in the event that the driving event satisfies the non-transmitting criteria, indicating that the driving event is not to be transmitted to a vehicle data server; and
in the event that the event does not satisfy the non-transmitting criteria, sending the driving event data through an interface to the vehicle data server over a network.

21. A computer program product for recording and transmitting a driving event, the computer program product being embodied in a tangible non-transitory computer readable storage medium and comprising computer instructions for:
receiving a portion of sensor data from a plurality of sensors coupled to a vehicle;
receiving a set of map data comprising location-specific legal information;
detecting a driving event based at least in part on the portion of sensor data and the location-specific legal information, wherein the detected driving event comprises a stop sign violation, a parking zone violation, or a railroad crossing violation;
checking the driving event against an exception database comprising locations of errors in the location-specific legal information, wherein the locations of errors comprise a stop sign error location, a parking zone error location, a railroad crossing error location, or any combination thereof;
determining whether the driving event satisfies a non-transmitting criteria, wherein the non-transmitting criteria comprises an exception indication as found in the exception database; and
in the event that the driving event satisfies the non-transmitting criteria, indicating that the driving event is not to be transmitted to a vehicle data server; and
in the event that the event does not satisfy the non-transmitting criteria, sending the driving event data through an interface to the vehicle data server over a network.

* * * * *